June 9, 1931. R. H. HARGREAVES 1,809,033
EMULSIFYING APPARATUS
Filed Dec. 17, 1928  2 Sheets-Sheet 1
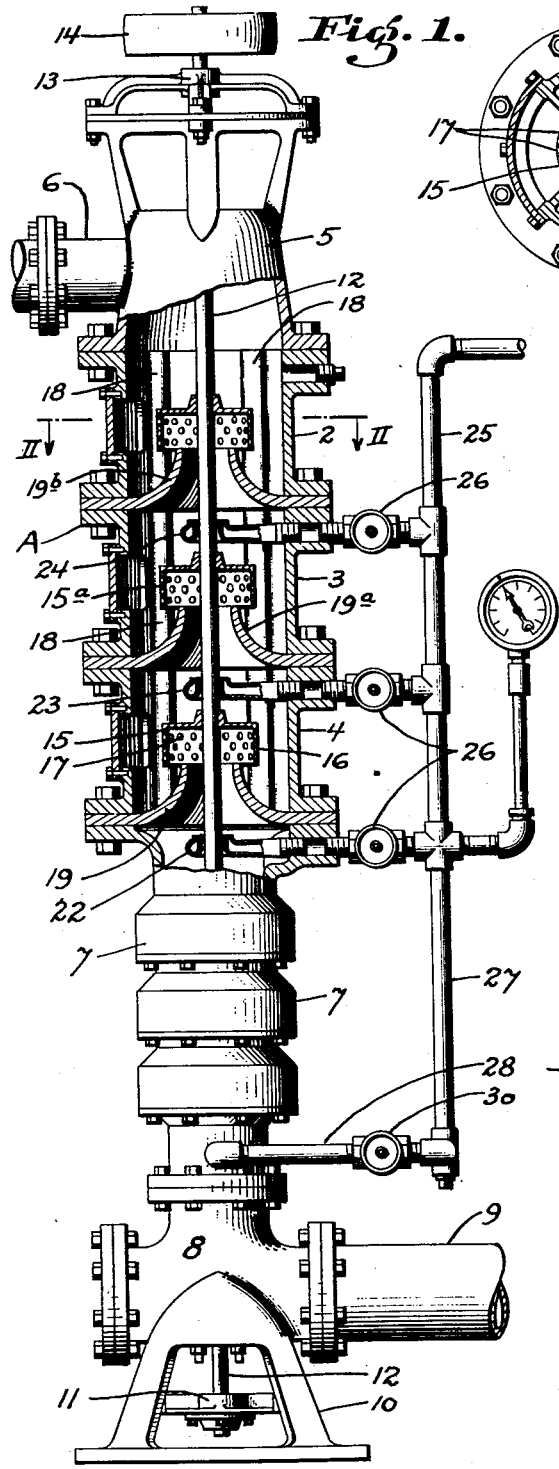
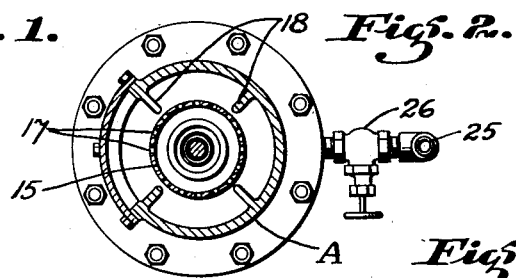
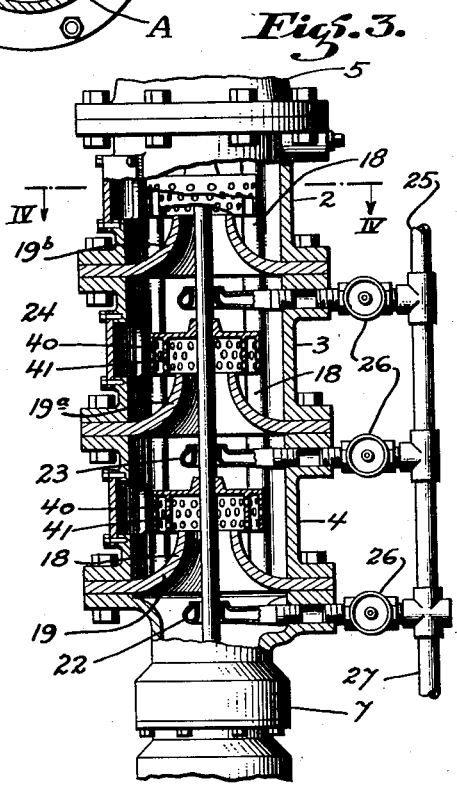
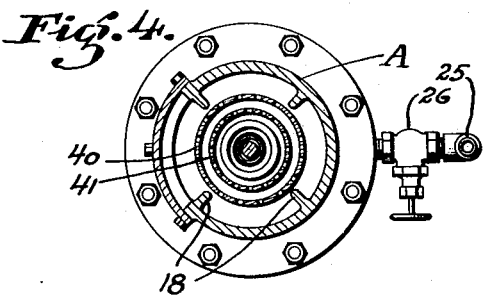
INVENTOR.
Robert H. Hargreaves.
BY Townsend, Loftus & Abbett
ATTORNEYS.

June 9, 1931.  R. H. HARGREAVES  1,809,033
EMULSIFYING APPARATUS
Filed Dec. 17, 1928    2 Sheets-Sheet 2
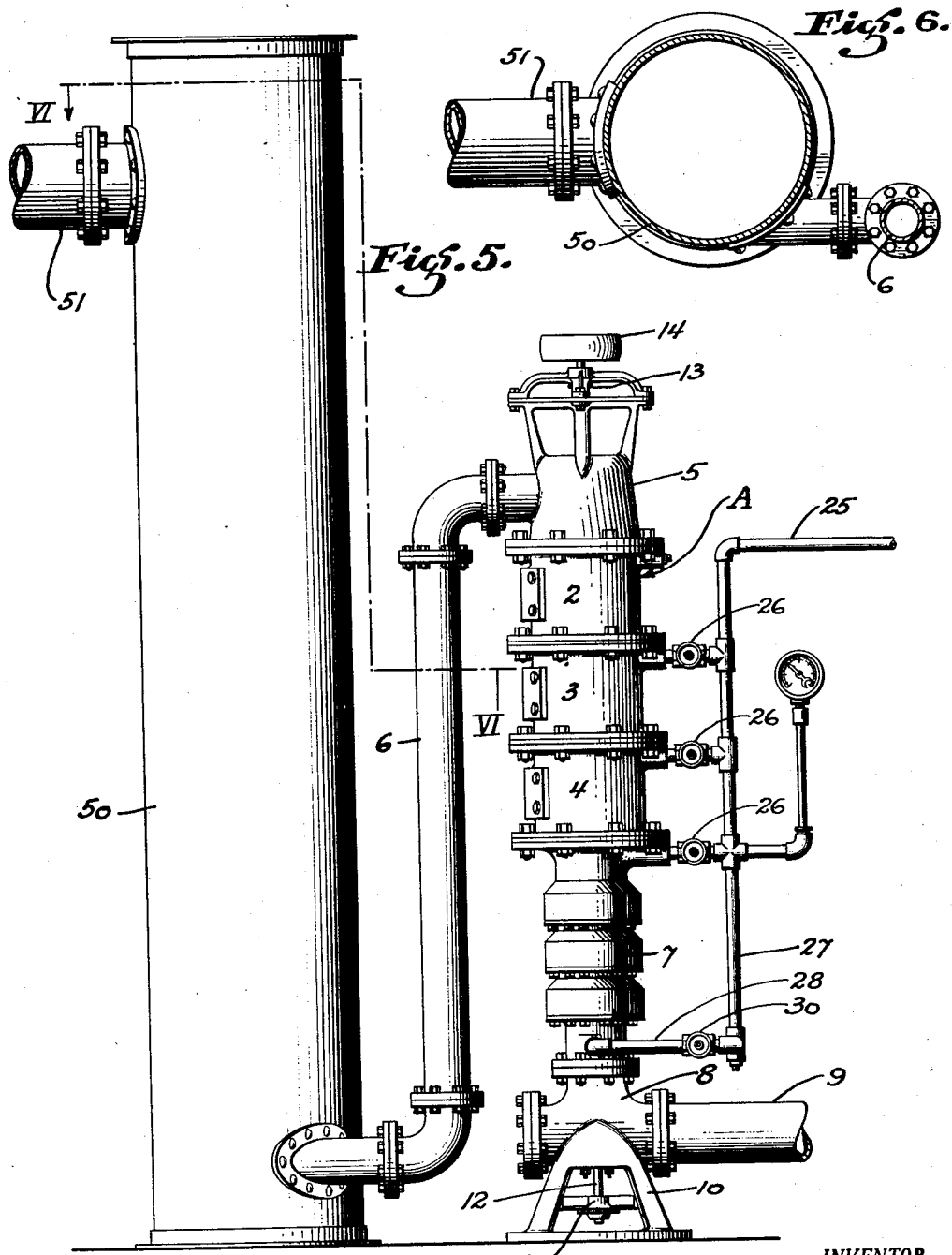
INVENTOR.
Robert H. Hargreaves
BY
Townsend, Loftus & Affett
ATTORNEYS.

Patented June 9, 1931

1,809,033

UNITED STATES PATENT OFFICE

ROBERT H. HARGREAVES, OF SAN JOSE, CALIFORNIA, ASSIGNOR OF ONE-THIRD TO DUNCAN STEWART AND ONE-THIRD TO A. M. RIESEN, BOTH OF SAN JOSE, CALIFORNIA

EMULSIFYING APPARATUS

Application filed December 17, 1928. Serial No. 326,670.

This invention relates to an emulsifying apparatus, and especially to an apparatus whereby an intimate mixture or emulsion may be formed between liquids and gases.

The object of the present invention is to generally improve and simplify the construction and operation of apparatus of the character described; to provide an apparatus which is particularly adapted to form an intimate mixture or emulsion between liquids and gases, to provide an apparatus which is continuous in operation; to provide an apparatus which is adapted to emulsify by rotary agitation and centrifugal action; and further to provide an emulsifying apparatus which is comparatively small and compact and economical in power consumption. It should be understood that the word "emulsion" is properly descriptive of a liquid mixture in which one substance, generally a fat, is suspended in a liquid. The suspension of a gas in a liquid, however, is often accomplished in a manner similar to that used in forming an emulsion and due to the analogy of the processes the word "emulsify" has been commonly applied to either operation. The use of the word throughout this specification is intended for interpretation in its broader sense, as the apparatus to which this invention pertains is equally effective for either purpose. The emulsifying apparatus is shown by way of illustration in the accompanying drawings, in which:

Fig. 1 is a side elevation of the emulsifying apparatus, the apparatus being shown partially in section, Fig. 2 is a cross section taken on line II—II Fig. 1, Fig. 3 shows a slightly modified form of the apparatus, Fig. 4 is a cross section taken on line IV—IV, of Fig. 3, Fig. 5 is a side elevation of the emulsifying apparatus shown in Fig. 1, the emulsifying apparatus being, in this instance, connected with a reaction tank, Fig. 6 is a cross section taken on line VI—VI of Fig. 5.

Referring to the drawings in detail, particularly Fig. 1, A indicates in general a housing built up of sections indicated at 2, 3 and 4. Secured to the uppermost section is a discharge housing 5, and communicating therewith is a discharge pipe 6. Connected with the lowermost section 4 of the housing is a series of pumps, generally indicated at 7, and connected with the lowermost pump is an inlet connection 8, and an inlet pipe 9, the inlet connection 8 being provided with a foot extension or base 10, whereby the pumps 7, the housing A and the discharge connection 5 are supported. Formed in the base or foot extension 10 is an end thrust bearing 11, and supported thereby is a drive shaft 12. This shaft extends upwardly through the pumping unit 7, the housing A, and the discharge connection 5, and it is journalled at the upper end in a bearing 13, the shaft being driven in any suitable manner, as by means of a pulley such as shown at 14 or the like.

Secured on the drive shaft 12 are a plurality of rotors, such as indicated at 15. These rotors are all identical in construction and each consists of a horizontal disc provided with a downwardly projecting annular flange 16. The flanges are provided with numerous perforations, as indicated at 17 and the function of the perforated flanges will hereinafter be described.

Formed on the inner surface of each housing section 2, 3 and 4 are inwardly projecting radially disposed ribs, such as indicated at 18, and interposed between each housing section is a nozzle member 19. The nozzles have two main functions, first that of forming communication between the several housing sections, and secondly that of directing the fluids to be emulsified upwardly into the rotors. Disposed below each nozzle 19 is an annular nozzle and these nozzles are indicated at 22, 23 and 24. The nozzles are all connected with a supply pipe 25, and valves are interposed, as indicated at 26, to regulate the discharge of each nozzle. The supply pipe 25 is also connected with an auxiliary supply pipe, such as indicated at 27, and this is in turn connected through means of a pipe 28 with the lower end of the pumping units indicated at 7, the flow through the pipe 28 being regulated by the valve 30, as will hereinafter be described.

The emulsifying apparatus here described has so far been used in connection with the purfication of gas, such as used for fuel and illuminating purposes and in order that the use and operation of the emulsifying apparatus shall be clearly understood a brief explanation of the manufacture of illuminating or fuel gas by the oil gas process will be submitted.

The oil from which the gases are generated is passed through generators, where the gases are formed. The gases, upon leaving the generators are first passed through washers and secondly through scrubbers. They then pass to a relief holder or receiver. The gases, in passing through the washer and scrubber, are relieved of mechanical impurities, such as tar, lamp black and naphthalene. They are also relieved of a small percentage of chemical impurities. When the gases arrive in the relief holder they contain the major portion of the chemical impurities which must be removed, the main chemical impurities being hydrogen sulphide and other sulphur compounds. To remove these chemical impurities it is common practice to pass the gases through a purifier containing a liquid solution capable of absorbing the hydrogen sulphide and other sulphur compounds. The solution usually consists of sodium carbonate and sodium bicarbonate. In other words, a caustic solution made up of water and sodium carbonate at a strength of approximately 1 to 3%. The hydrogen sulphite content of the gases, and other sulphur compounds, combine with the sodium carbonate as the gases pass through the solution and sodium hydrogen sulphide and sodium bicarbonate are formed. This solution soon becomes spent or inactive and it is then necessary to either renew the solution or to regenerate it.

The emulsifying apparatus forming the subject matter of the present application is provided for the purpose of regenerating this solution. The solution enters the pipe 9 and is forced by the pumps 7 into the lowermost emulsifying chamber through the lowermost nozzle 19. Air is admitted at the same time through the nozzle 22. The air and the solution enter the lower end of the rotor 15 and as it is rotating at a high velocity the air and liquid are discharged outwardly against the inner surface of the housing section 4, through the perforations 16. The liquid and air are thus intimately mixed and they are further mixed by the action of the baffles or ribs indicated at 18. The mixture of liquid and air then enters the second emulsifying chamber through the second nozzle indicated at 19a. A further quantity of air is here introduced by the nozzle 23. The mixture is again discharged by the rotor 15a and is further emulsified and is then directed through the upper nozzle 19a into the uppermost emulsifying chamber, together with additional air added by the nozzle 24, the liquid and gaseous mixture being finally discharged into the connection 5 from where it passes through the discharge pipe 6. In some instances it may be immediately returned to the purifier, and in other instances it is desirable that the reaction be given more time. In such an instance the discharge pipe 6, see Fig. 5, enters the lower end of a reaction tank 50 and as the mixture of liquid and gas rises ample time to complete the reaction is obtained. The air escapes at the upper end of the tank and the regenerated liquid is returned to the purifier through the pipe 51.

Regeneration of the spent solution containing sodium hydrogen sulphide and sodium bicarbonate is caused by oxidation. The oxygen of the air entering through the nozzles indicated at 22, 23 and 24 causes oxidation of the sodium hydrogen sulphide and of a portion of the sodium bicarbonate and when the reaction is completed, sodium carbonate is liberated and so is free sulphur, the sulphur being in the solid state and it is removed by flotation and filtration. By employing an apparatus such as here illustrated the caustic solution may be continuously regenerated and the operation of the purifier which removes the hydrogen sulphide and other sulphur compounds may thus also be continuous. The air which delivers the oxygen may thus be continuous. The air which delivers the oxygen required to regenerate the solution may be supplied by a pressure blower or compressor not here illustrated, and the pressure required on the air will depend upon the height to which the liquid is elevated etc. If the pumps indicated at 7 are of the rotary type it is obvious that the air may also be introduced by the pipe indicated at 28, as pumps of this character will also materialy assist in forming an emulsion. In Fig. 1 the rotors indicated at 15 are provided with a single perforated downwardly turned annular flange. In Fig. 3 the rotors are shown as provided with two concentric annular flanges both of which are perforated. These flanges are indicated at 40 and 41. A more intimate mixing action is formed by such a structure.

The vertical arrangement of the emulsifying chambers, the pumps 7 etc., produces a compact apparatus capable of continuously handling a large volume of liquid and gas. The mechanism is simple and power consumption becomes economic. The reaction between the oxygen of the air and the sulphur compounds contained in the liquids depends upon the degree of emulsification obtained, or in other words, intimate contact between the reagents. Intimate contact is obtained by an apparatus such as here shown and the time element required in a reaction of this character is thus materially reduced, emulsification being not only obtained by the centrifugal action of the rotors but also by agitation caused by the vertical baffle veins 18 arranged within the respective chambers exterior of the rotors.

While the apparatus is particularly designed for emulsifying liquids and gases, it is obvious that other substances may be treated for the same purpose or otherwise, and while certain features of the present invention are more or less specifically described, I wish it understood that various changes may be resorted to within the scope of the appended claims, similarly that the materials and finishes of the several parts employed may be such as the manufacturer may decide, or varying conditions or uses may demand.

Having thus described my invention, what I claim and desire to secure by Letters Patent is:

1. In a device of the character described a housing, an inverted perforated cup-shaped rotor journalled within the housing said housing having an inlet opening formed in its lower end, and a discharge opening in its upper end, means for delivering a liquid through the inlet opening and for directing the liquid into the rotor, means for delivering a gaseous fluid and for directing it, together with the liquid into the rotor, means for rotating the rotor to centrifugally emulsify and discharge the liquid and the gas, and stationary agitating members vertically disposed within the housing exterior of the rotor and cooperating therewith to cause further agitation and emulsification of the fluids.

2. In a device of the character described a housing having an inlet formed in its lower end and a discharge opening formed in its upper end, a drive shaft extending through the housing and said openings, an inverted cup-shaped perforated rotor secured on the shaft within the housing, a pump for delivering a liquid to the inlet opening and for directing the liquid into the opening end of the rotor, a nozzle disposed adjacent the open end of the rotor and adapted to deliver a gaseous fluid, means for rotating the drive shaft and the rotor to centrifugally emulsify the liquid and gas and for discharging it from the rotor, and a plurality of vertically disposed agitating ribs formed on the inner surface of the housing and surrounding the rotor.

3. In a device of the character described a housing having an emulsifying chamber formed therein, a drive shaft extending through the chamber, a rotor on said shaft, said rotor comprising a horizontally disposed disc having an annular downwardly turned flange formed thereon and said flange being provided with a plurality of perforations, means for directing fluids to be emulsified upwardly within the annular flange of the rotor, said rotor adapted to centrifugally emulsify and discharge the fluids radially and outwardly through the perforations in the flange and means for producing a secondary emulsifying action, said means comprising stationary vertically disposed ribs which are formed on the inner surface of the housing and against which the fluids are projected by the rotor.

4. A device of the character described comprising a vertically disposed housing having a plurality of superposed emulsifying chambers formed therein, said chambers being in communication with each other, the lowermost chamber having an inlet opening formed therein and the uppermost chamber having a discharge opening formed therein, a drive shaft extending through the several chambers, a plurality of rotors secured on the shaft, one in each chamber, said rotors being inverted and cup-shaped and provided with perforated walls, means for delivering a liquid to the inlet of the lowermost chamber and for maintaining it in continuous circulation through the various chambers so that a continuous discharge will be obtained from the discharge opening, means for directing the liquid successively through the several rotors, means adjacent the lower end of each rotor for delivering a gaseous medium and for directing it upwardly into the respective cups and means for rotating the drive shaft and the rotors to centrifugally emulsify the liquid and gas.

5. In a device of the character described a housing having an inlet formed in its lower end and a discharge opening at its upper end, a drive shaft extending through the housing, an inverted perforated cup-shaped rotor secured on the shaft within the housing, a pump housing disposed below the first named housing and connected with the lower inlet of said housing, said drive shaft extending through the pump housing and adapted to drive the pump, means for delivering a liquid to the pump, said pump discharging the liquid into the housing and causing a circulation of liquid therethrough, means for directing the liquid upwardly into the cup-shaped rotor, means for directing gas upwardly into the cup-shaped rotor, said means also adapted to deliver gas to the pump, said pump and rotor adapted to form an emulsion between the fluids.

ROBERT H. HARGREAVES.